United States Patent [19]

Kawakita

[11] Patent Number: 5,789,704

[45] Date of Patent: Aug. 4, 1998

[54] CONTAINER WITH HEAT REMOVING FEATURES FOR CONTAINING AN ELECTRONIC CONTOL UNIT

[75] Inventor: Shinji Kawakita, Yokkaichi, Japan

[73] Assignee: Sumitomo Wiring Systems, Ltd., Japan

[21] Appl. No.: 753,956

[22] Filed: Dec. 3, 1996

[30] Foreign Application Priority Data

| Dec. 6, 1995 | [JP] | Japan | 7-318250 |
| Dec. 6, 1995 | [JP] | Japan | 7-318252 |
| Dec. 11, 1995 | [JP] | Japan | 7-321584 |

[51] Int. Cl.$^6$ ............................................. H05K 5/00
[52] U.S. Cl. ................... 174/52.1; 361/689; 174/17 VA
[58] Field of Search .................... 174/52.1, 65 SS; 361/736, 752, 689, 690, 692, 693, 701, 728; 165/80.3; 312/205; 220/4.02

[56] References Cited

U.S. PATENT DOCUMENTS

| 4,734,820 | 3/1988 | Lauffer et al. | 361/700 |
| 4,763,224 | 8/1988 | Bentz et al. | |
| 4,980,754 | 12/1990 | Kotani et al. | 257/716 |
| 5,173,819 | 12/1992 | Takahashi et al. | 360/80.3 |
| 5,365,400 | 11/1994 | Ashiwake et al. | 361/752 |

FOREIGN PATENT DOCUMENTS

| 2 676 885 | 11/1992 | France . |
| 43 07 902 C1 | 6/1994 | Germany . |
| 43 03 908 A1 | 8/1994 | Germany . |
| 63-55733 | of 1988 | Japan . |
| 3-127428 | of 1991 | Japan . |

*Primary Examiner*—Kristine L. Kincaid
*Assistant Examiner*—Kristina Soderquist
*Attorney, Agent, or Firm*—Anthony J. Casella; Gerald E. Hespos; Ludomir A. Budzyn

[57] ABSTRACT

A container for an electronic control unit is provided for preventing heat transmission and entrance of water moisture at a low cost. An electronic control unit (1) is contained in a container (12) which is to be arranged in an engine compartment (2b). The container (12) includes a first box unit (14) and a second box unit (15). The first box unit (14) includes an inner box (20) for containing the electronic control unit (1) and an outer box (21) which defines a first heat removing space (32A) in cooperation with side walls (46a to 47b) of an upper portion of the inner box (20). The second box unit (15) is continuous with a bottom end of the outer box (21) of the first box unit (14) and defines a second heat removing space (32B) in cooperation with side walls (46a to 47b) of a lower portion of the inner box (20) and a bottom wall (48) of the inner box (20). The bottom end of the outer box (21) of the first box unit (14) and an upper end of the second box unit (15) are secured by welding.

14 Claims, 8 Drawing Sheets

5,789,704

1

CONTAINER WITH HEAT REMOVING FEATURES FOR CONTAINING AN ELECTRONIC CONTOL UNIT

BACKGROUND OF THE INVENTION

1. Field of the Invention

The present invention relates to a container for an electronic control unit and, particularly to a container for an electronic control unit for an electronic fuel injector, an antiblocking system or like device arranged in an engine compartment of an automotive vehicle which is in a high temperature atmosphere and upon which water moisture is frequently thrust. The present invention relates particularly to a water discharging construction of a container for containing an electronic control unit for an electronic fuel injector, an antiblocking system or like device arranged in an engine compartment of an automotive vehicle upon which water moisture is likely to be thrust.

2. Description of the Prior Art

An automotive vehicle may be provided with an electronic control unit (ECU) for an electronic fuel injector (EFI) of an engine and an antiblocking system (ABS).

As shown in FIG. 7, an ECU 1 is generally arranged in a passenger compartment 2a of a vehicle 2. This is because, if the ECU 1 is arranged in the engine compartment 2b, the ECU 1 may be influenced by heat because of a high temperature atmosphere in an engine compartment 2b and water moisture thrust upon the engine compartment 2b during high pressure car wash may enter the ECU 1.

However, if the ECU 1 for controlling the engine is arranged in the passenger compartment 2a, it is necessary to extend a wiring harness W from the engine compartment 2b to the passenger compartment 2a, with the result that the wiring harness W needs to be lengthened and a hole needs to be formed in a panel 2c partitioning the passenger compartment 2a and the engine compartment 2b in order to pass the wiring harness W therethrough. This leads to a cumbersome operation and a higher production cost.

On the other hand, Japanese Unexamined Utility Model Publication No. 63-55733 discloses an electrical connection box 5 as shown in FIGS. 8 and 9 which is constructed such that heat inside the electrical connection box can be discharged outside.

The electrical connection box 5 includes upper and lower casings 6 and 9. A side wall 6a of the upper casing 6 is caused to bulge outward in specified positions, thereby forming an intake port 7 and an exhaust port 8 at the edge of the side wall 6a, and a plurality of ribs 6b are formed on the inner surface of the side wall 6a. In this electrical connection box 5, an air path 10 stretching in a zigzag manner circumventing the ribs 6b from the intake port 7 to the exhaust port 8 is formed between the inner surface of the side wall 6a of the upper casing 6 and the outer surface of the lower casing 9.

However, in the electrical connection box 5, water moisture may enter through the open intake port 7 and exhaust port 8. Accordingly, this electrical connection box 5 is not suited to being arranged in the engine compartment 2b upon which water moisture is thrust during a high pressure car wash or the like as described above.

Further, since the intake port 7 and the exhaust port 8 are formed in the side wall 6a of the upper casing 6 in the electrical connection box 5, if the electrical connection box 5 is arranged in the engine compartment 2b in a high temperature atmosphere, not a cool air but a hot air enters

2 through the intake port 7. Accordingly, the temperature inside the electrical connection box 5 may increase rather than decrease. Thus, even if the construction like the electrical connection box 5 is adopted, a temperature increase and entrance of water moisture in the ECU 1 arranged in the engine compartment 2b cannot be prevented.

Further, Japanese Unexamined Utility Model Publication No. 3-127428 discloses a construction in which a cover is fitted to an electrical connection box arranged in an engine compartment, and an air duct is connected with this cover to prevent a temperature increase in the electrical connection box. However, even such a construction cannot prevent the entrance of water moisture during a high pressure car wash.

In order to prevent both a temperature increase and an entrance of water moisture in the ECU arranged in the engine compartment, a container 11 for the ECU 1 may have such a double wall construction including outer and inner walls 11a, 11b that a heat removing space lid is formed around a containing portion 11c of the ECU 1 as shown in FIG. 10.

However, in this case, since a portion of the outer wall 11a indicated by A in FIG. 10 is a so-called undercut in a mold, the container 11 cannot be produced by usual injection molding. The requires another production method such as a blow molding, leading to an increased production cost.

The present invention was developed to solve the problems residing in the prior art, and an object thereof is to produce a container for an electronic control unit which can prevent a heat transmission to an ECU even in a high temperature atmosphere, displays an excellent watertightness, and is in particular suited to being arranged in an engine compartment.

SUMMARY OF THE INVENTION

According to the invention, there is provided a container for containing an electronic control unit. The container may be constructed to be mounted in an engine compartment. In particular the container may comprise a first box unit having an inner box for containing an electronic control unit and an outer box which defines at least one first heat removing space in cooperation with the inner box.

Due to the air flow coming from the outside of the vehicle, the electronic control device can be effectively cooled, i.e. the internally generated heat is transported to the outside, and/or it is effectively prevented that air from the engine compartment enters the space surrounding or around the electronic control device thus in particular increasing its temperature.

According to a preferred embodiment of the invention, the container further comprises a second box unit which may be unitarily or integrally formed or connected with the first box unit, in particular with the outer box of the first box unit. The second box unit may define a second heat removing space in cooperation with the first box unit, in particular with one or more side walls of the inner box and at least one wall of the inner box.

Preferably, a lower end of the outer box of the first box unit and an upper end of the second box unit are secured or mounted or connected to each other.

The lower end of the first box unit defines a contact portion that is welded to the upper end of the second box unit and projects into the second heat removing space.

According to a further preferred embodiment of the invention, the container further comprises a lid for substantially closing an opening in an upper surface of the inner box and/or the outer box. Preferably, the lid has a double sealing construction comprising an outer sealing frame, provided substantially along the periphery of the lid, into which an upper end of the outer box of the first box unit is insertable. The double seal further comprises an inner sealing frame provided inwardly of and at a specified distance from the outer sealing frame. An upper end of the first box unit, in particular, an upper end of the inner box thereof, is insertable into the outer sealing frame. Preferably packing members are arrangeable or arranged on bottom portions of the outer and/or inner sealing frames.

According to the invention, there is further provided a container or a water discharging construction of a container for an electronic control unit according to one or more of the precedingly described embodiments. The water discharging construction comprises a housing, in which a device, such as a circuit board, is arranged. An outlet, opening or clearance formed in the bottom wall of the housing. A water storing portion is provided for storing water moisture which enters the housing. The electronic control unit is contained therein such that a wire arrangement surface thereof extends substantially along the vertical direction.

According to a further preferred embodiment, the water storing portion is formed between the bottom wall of the electronic control unit and the bottom wall of the container by forming a projected portion on the inner surface of the bottom wall of the container and/or on the outer surface of the bottom wall of the electronic control unit. Thus water moisture which enters the housing of the electronic control unit runs down or flows to the water storing portion and is discharged through the clearance or outlet means formed at the bottom wall of the housing.

Preferably, the housing is formed by joining two or more pieces, and the outlet is formed at a joined portion of the pieces.

Further preferably, the projected portion comprises long or oblong projections spaced apart, substantially in parallel, by a specified distance. The projections may be arranged at specified intervals along lateral and/or longitudinal directions.

According to a further preferred embodiment of the invention, there is provided a container for containing an electronic control unit to be arranged in an engine compartment. The container comprises a first box unit comprising an inner box for containing an electronic control unit and an outer box which defines a first heat removing space in cooperation with side walls of an upper portion of the inner box. The container further comprises a second box unit which is continuous with a bottom end of the outer box of the first box unit and which defines a second heat removing space in cooperation with side walls of a lower portion of the inner box and a bottom wall of the inner box. A lower end of the outer box of the first box unit and an upper end of the second box unit are secured to each other.

The above container is constructed such that two separate box units, namely the first and second box units, are secured and the second heat removing space is formed at a lower portion of the first box unit by inserting the lower portion of the first box unit into the second box unit. Accordingly, this container does not have a so-called undercut, and the first and second heat removing spaces can be formed around the inner box by injection molding using a usual mold.

As is clear from the above description, the above container for an electronic control unit comprises the first box unit including the inner box for containing the electronic control unit and the outer box which defines the first heat removing space in cooperation with the side walls of the upper portion of the inner box. Further, the first box unit is secured to the second box unit formed separately therefrom, and the second heat removing space is formed at the lower portion of the first box unit by inserting the lower portion of the first box unit including the inner and outer box into the second box unit. Accordingly, this container does not have a so-called undercut, and can be produced at a relatively low cost by injection molding using a usual mold.

Further, since the first and second heat removing spaces are formed around the electronic control unit, the transmission of heat to the electronic control unit can be prevented even when the electronic control unit is arranged in a high temperature atmosphere such as in an engine compartment.

Contact portions of the lower end and the upper end may be welded. More particularly, the lower end of the outer box of the first box unit or the upper end of the second box unit projects toward the second heat removing space, and extends in contact with the inner surface of the other in a secured portion of the lower end of the first box unit and the upper end of the second box unit.

Accordingly, since the first and second box units are secured by welding, they can be connected with a high strength. Further, by welding the first and second box units and by causing either one of the lower end of the outer box of the first box unit and the upper end of the second box unit to project toward the second heat removing space while extending in contact with the inner surface of the other, the entrance of water moisture into the second heat removing space through the secured portion of the first and second box units can be prevented.

Accordingly, since the contact portion of the lower end of the outer box of the first box unit and the upper end of the second box unit are welded, the first and second box units can be firmly secured. Further, by causing either one of the lower end of the outer box of the first box unit and the upper end of the second box unit to project into the second heat removing space beyond the contact surface while extending in contact with the inner surface of the other, the entrance of water moisture into the second heat removing space through the secured portion of the first and second box units can be securely prevented.

According to a further preferred embodiment of the invention, there is provided a container for an electronic control unit, comprising, a container main body comprised of an inner box for containing an electronic control unit and an outer box surrounding the inner box while defining a heat removing space in cooperation with the inner box. The container further comprises a lid for closing an upper surface of the container main body. The lid has a double sealing construction comprising: an outer sealing frame, provided along the periphery of the lid, into which an upper end of the outer box is insertable, an inner sealing frame, provided inwardly of and at a specified distance from the outer sealing frame, into which an upper end of the inner box is insertable, and packing members arranged in bottom portions of the outer and inner sealing frames.

Thus there is provided a container for an electronic control unit which can prevent a heat transmission to an ECU even in a high temperature atmosphere, displays an excellent watertightness, and is suited to being arranged in an engine compartment.

In the above container, the lid is provided with the outer and inner sealing frames in which the packing members are arranged, and the upper ends of the outer and inner boxes of the container main body containing the electronic control unit are inserted into the outer and inner sealing frames forming a double sealing construction. Accordingly, the entrance of water moisture into the interior of the container main body through a joined portion of the container main body and the lid can be securely prevented.

Further, since the container main body comprises the inner box for containing the electronic control unit and the outer box surrounding the inner box while defining the heat removing space in cooperation with the inner box, transmission of heat in an engine compartment to the electronic control unit can be prevented.

As is clear from the above description, the lid is provided with the outer and inner sealing frames in which the packing members are arranged, and the upper ends of the outer and inner boxes of the container main body containing the electronic control unit are inserted into the outer and inner sealing frames forming a double sealing construction. Accordingly, the joined portion of the container main body and the lid is securely sealed, leading to a high watertightness in the container. Thus, even if water moisture is thrust upon the container arranged in an engine compartment, e.g. during a high pressure car wash, the entrance of water moisture into the electronic control unit in the container can be securely prevented. Further, since the container main body comprises the inner box for containing the electronic control unit and the outer box surrounding the inner box while defining the heat removing space in cooperation with the inner box, transmission of heat in the engine compartment to the electronic control unit can be prevented.

According to a further aspect of the invention, there is provided a water discharging construction of a container for an electronic control unit comprising a housing, a circuit board accommodated in the housing, and a clearance formed in the bottom wall of the housing, the electronic control unit being contained such that a wire arrangement surface thereof extends along the vertical direction. The water discharging construction comprises a water storing portion formed between the bottom wall of the electronic control unit and the bottom wall of the container by forming a projected portion on the inner surface of the bottom wall of the container or on the outer surface of the bottom wall of the electronic control unit. Consequently, water moisture which enters the housing of the electronic control unit runs down to be discharged to the water storing portion through the clearance formed at the bottom wall of the housing. Thus there is provided a container or a water discharging construction for a container allowing rapid discharge of water moisture even if the water enters an ECU.

Accordingly, the electronic control unit is contained in the container such that the wire arrangement surface extends along the vertical direction, the water moisture having entered the housing runs down to be discharged through the clearance at the bottom wall of the housing, and the water storing portion is formed between the bottom wall of the electronic control unit and the bottom wall of the container by forming the projected portion on the inner surface of the bottom wall of the container or on the outer surface of the bottom wall of the electronic control unit. Therefore, the water moisture having entered the housing is stored in the water storing portion and rapidly evaporates.

As is clear from the above description, in the above water discharging construction of the container for the electronic control unit, the electronic control unit is contained in the container such that the wire arrangement surface extends along the vertical direction, the water moisture having entered the housing is discharged through the clearance at the bottom wall of the housing, and the water storing portion is formed between the bottom wall of the electronic control unit and the bottom wall of the container by forming the projected portion on the inner surface of the bottom wall of the container or on the outer surface of the bottom wall of the electronic control unit. Accordingly, the water moisture having entered the housing and having formed dewdrops inside the housing is stored in the water storing portion and rapidly evaporates. Therefore, the water moisture which enters the electronic control unit can be securely discharged. As a result, the electronic control unit can be arranged in an engine compartment where it is subjected to water moisture during a high pressure car wash or the like.

The housing is preferably formed by joining two half pieces, and the clearance may be formed in a join portion of the half pieces.

The water discharging clearance provided at the bottom wall of the housing is formed in the joined portion of the two half pieces assembling the housing, it is not necessary to provide a special discharge hole for discharging the water moisture from the housing. Thus a production cost can be reduced.

The projected portion preferably comprises long projections spaced apart in parallel by a specified distance or projections arranged at specified intervals along lateral and longitudinal directions.

Thus, the water storing portion can be formed while the housing of the electronic control unit is securely supported.

The container preferably comprises an inner box for containing the electronic control unit and an outer wall portion spaced apart from the inner box with a heat removing space defined therebetween.

Thus, the influence of heat on the electronic control unit can be reduced, thereby making it more suitable to arrange the electronic control unit in the engine compartment in a hightemperature atmosphere.

These and other objects, features and advantages of the present invention will become more apparent upon a reading of the following detailed description and accompanying drawings.

DETAILED DESCRIPTION OF THE PREFERRED EMBODIMENT

Figure 1:
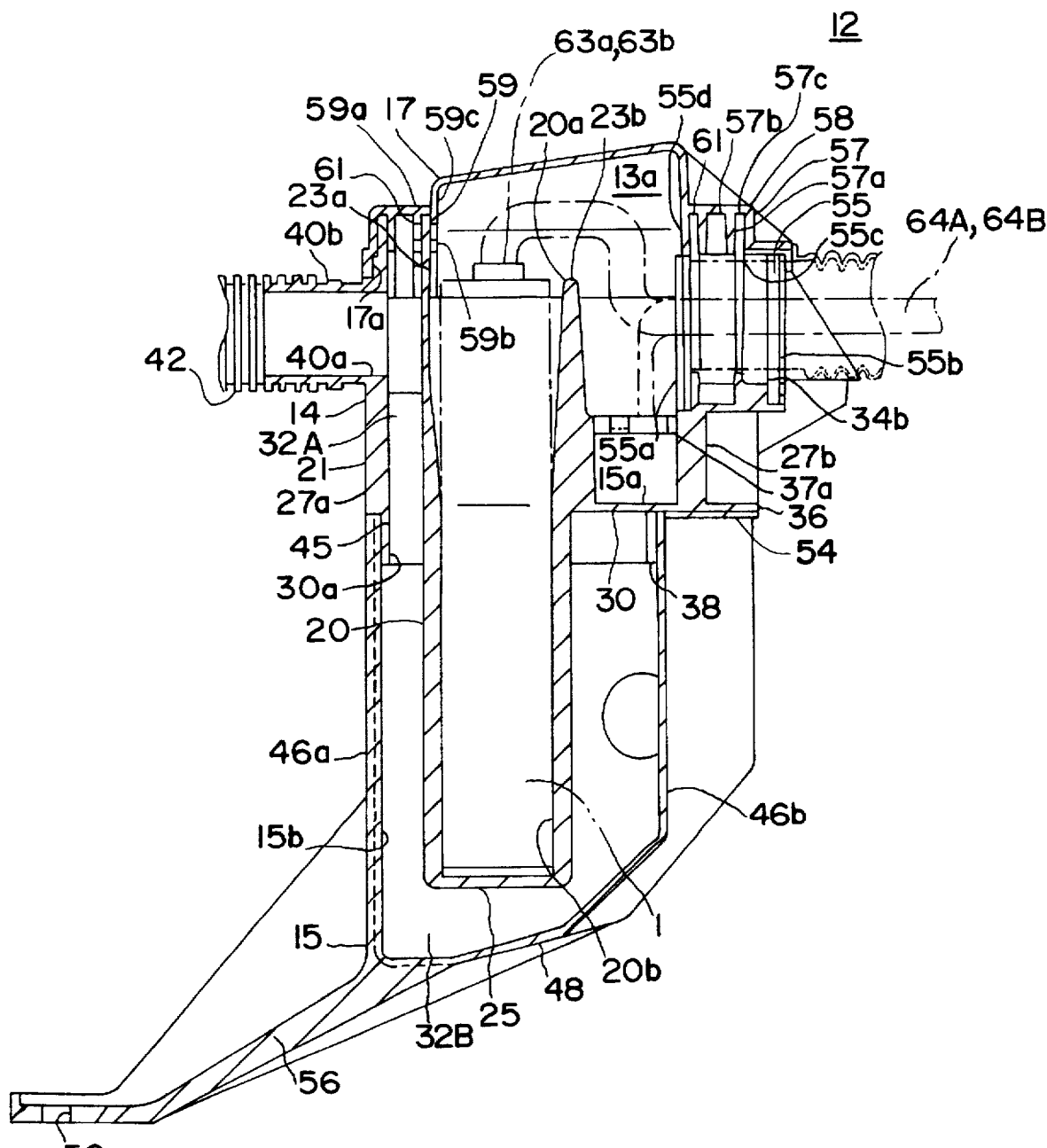
FIG. 1 is a longitudinal section of a container for an electronic control unit according to the invention.
Figure 2:
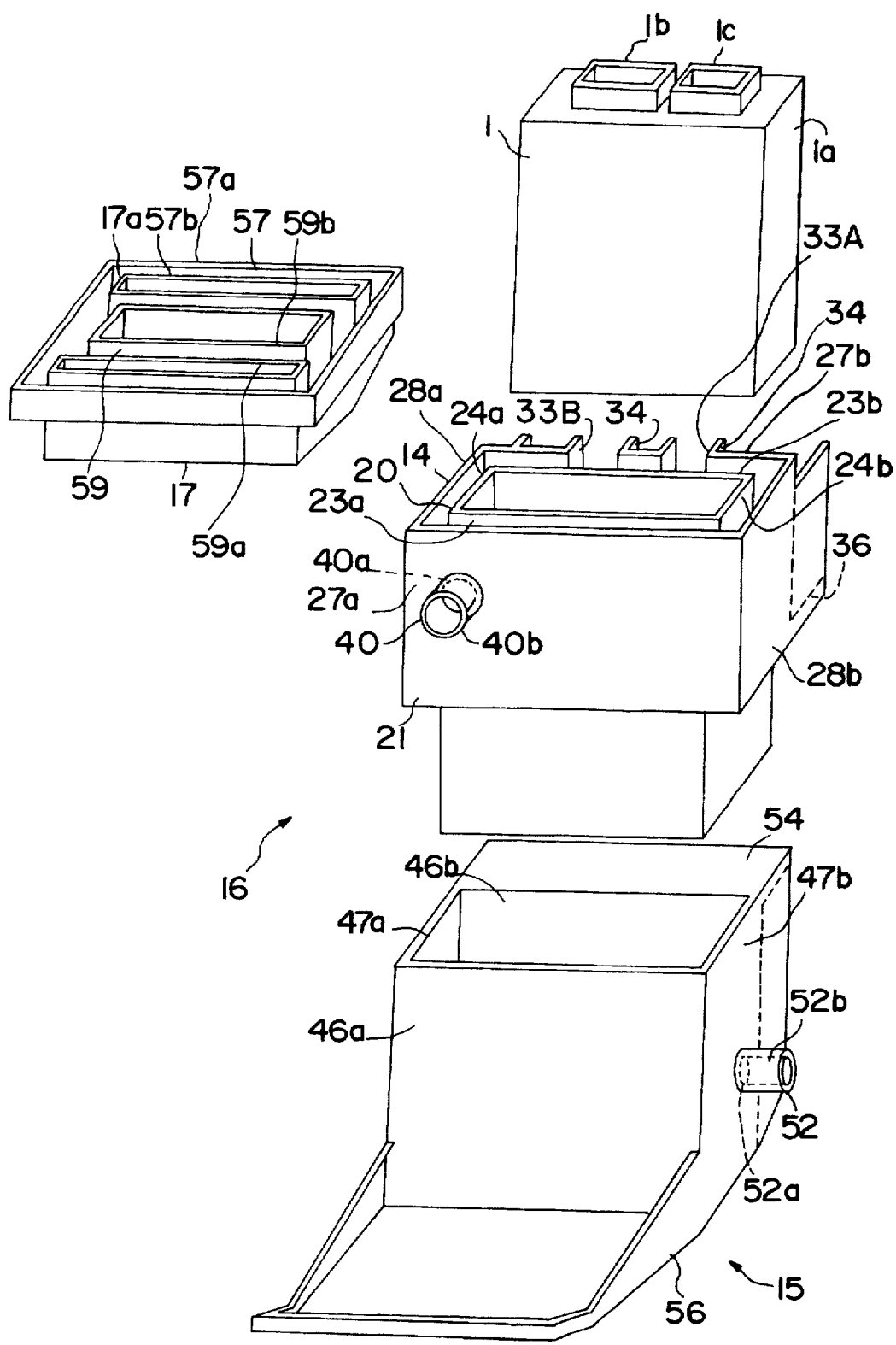
FIG. 2 is a schematic exploded perspective view of the container.
Figure 3:
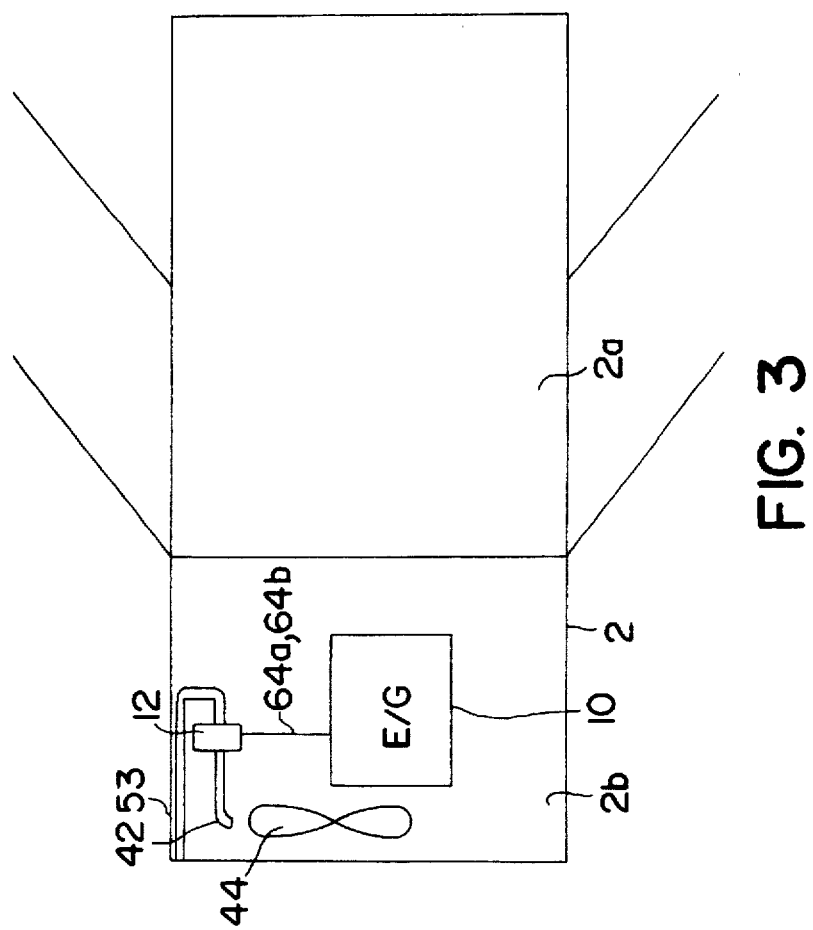
FIG. 3 is a diagram showing an arranged position of the container.

A container 12 for a device, preferably an electric or electronic control unit (ECU) 1 according to the invention as shown FIGS. 1 and 2 is arranged in an engine compartment of an automotive vehicle 2 as shown in FIG. 3.

This container 12 is made e.g. of resin, and includes a container main body 16 comprised of a first box unit 14 and a second box unit 15, and a lid or cover 17.

The first box unit 14 includes an inner box 20 for containing the ECU 1 and an outer box 21 surrounding an upper portion of the inner box 20.

The inner box 20 of the first box unit 14 has a substantially rectangular parallelepipedic shape having an opening 20a in its upper surface, and includes two pairs of opposite side walls 23a, 23b and 24a, 24b and a bottom wall 25. The length of the side wall 23a to 24b of the inner box 20 is set such that a housing 1a of the ECU 1 can be fitted in a containing portion 20b defined by the side walls 23a to 24b and the bottom wall 25.

The outer box 21 of the first box unit 14 includes two pairs of side walls 27a, 27b and 28a, 28b spaced apart from the corresponding side walls 23a to 24b of the inner box 20.

The bottom ends of the side walls 27a to 28b of the outer box 21 are located above those of the side walls 23a to 24b of the inner box 20, i.e. the outer box 21 surrounds only the upper portion of the inner box 20 while forming a first heat removing space or aperture 32A of a specified width in cooperation with the inner box 20. The outer box 21 also includes a bottom wall 30 connecting the bottom edges of the side walls 27a to 28b with the outer surfaces of the side walls 23a to 24b of the inner box 21. An opening 30a is formed in a part of the bottom wall 30 to communicate an interior of the outer box 21 with an interior 15b of the second box unit 15 to be described below.

A right side wall 27b of the outer box 21 in FIG. 1 is formed with notches 33A, 33B (FIG. 2) used to mount a U-shaped grommet 55. A conduit-shaped portion 34 is projecting outward from the side wall 27b at the periphery of each of the notches 33A, 33B. Grooves 34a, 34b into which large diameter portions 55a, 55b of the grommet 55 are fitted are formed in the conduit-shaped portions 34.

The bottom wall 30 of the outer box 21 projects outward from the side wall 27b, thereby forming a flat and rectangular flange portion 36. At the underside of the flange portion 36, a projection 38 extends downward in contact with the inner surface of a side wall 46b of the second box unit 15 to be described below.

The left side wall 27a of the outer box 21 in FIG. 1 is formed with an exhaust port portion 40. The exhaust port portion 40 includes a substantially circular opening 40a which is a through hole formed in the side wall 27a and a tubular portion 40b projecting from the side wall 27a so as to surround the opening 40a. One end of an exhaust pipe 42 is connected with the exhaust port portion 40. The other end of the exhaust pipe 42 is open in the vicinity of a fan 44 of a radiator so that air is sucked from the exhaust pipe 42 as the fan 44 rotates.

The outer surface of the left side wall 27a of the outer box 21 in FIG. 1 is cut to form a projection 45 which extends into a second heat removing space 32B in contact with the inner surface of a side wall 46a of the second box unit 15 when the first and second box units 14 and 15 are secured as described later.

The second box unit 15 has a substantially rectangular parallelepipedic shape having an opening 15a in its upper surface, and includes two pairs of opposite side walls 46a, 46b and 47a, 47b and a bottom wall 48.

The dimensions of the second box unit 15 are set such that a lower portion of the inner box 20 of the first box unit 14 is insertable into the interior 15b defined by the side walls 46a to 47b and the bottom walls 48 and that the second heat removing space 32B is formed between the side walls 23a to 23b and bottom wall 25 of the inner box 20 and the side walls 46a to 47b and bottom wall 48 of the second box unit 15.

The right side wall 47b of the second box unit 15 in FIG. 2 is formed with an intake port portion 52. The intake port portion 52 includes a substantially circular opening 52a which is a through hole formed in the side wall 47b and a tubular portion 52b projecting from the side wall 47a so as to substantially surround the opening 52a. One end of an intake pipe 53 (shown only in FIG. 3) is connected with the intake port portion 52. The other end of the intake pipe 53 communicates with the outside of the vehicle 2.

On the other hand, a flange 54 made of a substantially rectangular plate projects horizontally outward at the upper end of the right side wall 46b of the second box unit 15 in FIG. 1. The shape of the flange 54 is substantially same as that of the flange 36 provided at the outer box 21 of the first box unit 14. The flanges 36, 54 are placed in close contact with each other as shown in FIG. 1.

A bracket 56 formed with a bolt hole 56a at its leading end is provided at the bottom end of the second box unit 15. The container 12 is secured to a mount portion (not shown) provided at a vehicle body by fastening a bolt inserted through the bolt hole 56a. The bracket 56 has such a shape, to allow for a suitable orientation of the container 12 in or inside the automotive vehicle 2.

The first box unit 14 and the second box unit 15 are integrally or unitarily secured by inserting and accommodating the lower portion of the inner box 20 into the interior 15b of the second box unit 15 and by bringing the lower end surface of the first box unit 14 into contact with the upper end surface of the second box unit 15. Specifically, the projections 38, 45 of the outer box 21 of the first box unit 14 are inserted into the interior 15b such that they extend in contact with the inner surfaces of the side walls 46a, 46b of the second box unit 15, and the flanges 36, 54 of the first and second box units 14, 15 are placed in close contact with each other. The first and second box units 14 and 15 are secured by applying ultrasonic welding to the periphery of a join portion thereof or are unitarily or integrally formed or molded.

In this embodiment, the second heat removing space 32A is formed at the bottom and/or side portion of the inner box 20 by inserting the lower part of the first box unit 14 including the inner and outer boxes 20, 21 into the second box unit 15. Accordingly, the container main body 16 has such a double bottom or double wall construction in which the second heat removing space 32B is defined between the bottom wall 25 of the inner box 20 and the bottom wall 48 of the second box unit 15. However, this double bottom portion is not an undercut. Thus, the container 12 according to this embodiment can be produced e.g. by resin injection molding using a usual mold, with the result that a production cost can be reduced.

In this embodiment, since the first and second box units 14, 15 are secured by welding and an area of the joined portion is made larger by providing the flanges 36, 54, they can be joined with a high strength.

Further in this embodiment, the first box unit 14 is provided with the projections 38, 45 which project into the second heat removing space 32B while extending in contact with the inner surfaces of the side walls 46a, 46b of the second box unit 15 as described above. However the projections 38, 45 of the first box unit 14 may be extending in contact with the outer surfaces of the side walls 46a, 46b of the second box unit 15. Since the joined surfaces of the first and second box units 14, 15 between the outside and the second heat removing space 32A are long, the entrance of water moisture into the space 32A through the join portion of the first and second box units 14, 15 can be effectively prevented.

The first heat removing space 32A is defined between the side walls 23a to 24b of the inner box 20 and the side walls 46a to 47b of the outer box 21 as described above. Further, the side walls 46a to 47b of the second box unit 15 are continuous with the bottom ends of the side walls 27a to 28b of the outer box 21, and the second heat removing space 32B is defined between the lower portions of the side walls 23a to 24b and the bottom wall 25 of the first box unit 14 and the side walls 46a to 47b and bottom wall 48 of the second box unit 15. Since the opening 30a is formed in the bottom wall 30 of the outer box 21 of the first box unit 14, the first and second heat removing spaces 32A, 32B communicate with each other.

The lid 17 has a thin substantially rectangular parallelepipedic shape having an opening 17a in its lower part in FIG. 1. The lid 17 is provided with an outer sealing frame 57 along the periphery of the inner surface. The outer sealing frame 57 is fitted to an upper end of the outer box 21 of the first box unit 14 and the large diameter portions 55a, 55b of the grommet 55 arranged at the conduit-shaped portion 34 when the lid 17 is fitted to the opening 13a in the upper surface of the container main body 16. The outer sealing frame 57 includes a pair of opposite guide wall portions 57a, 57b. A packing member 58 is inserted into a bottom portion of a groove 57c formed between the guide wall portions 57a, 57b. The packing member 58 is a particularly annular member of elastic material such as rubber and has a known structure.

Further, an inner sealing frame 59 is provided inwardly of the outer sealing frame 57 inside the lid 17. The inner sealing frame 59 is fitted to an upper end of the inner box 20 of the first box unit 14 and the large diameter portions 55a, 55b of the grommet 55 when the lid 17 is fitted to the opening 13a in the upper surface of the container main body 16. Similar to the outer sealing frame 57, the inner sealing frame 59 includes a pair of opposite wall portions 59a, 59b. A second packing member 61 is inserted into a bottom portion of a groove 59c formed between the wall portions 59a and 59b. Similar to the first packing member 58, the second packing member 61 is a particularly annular member made of an elastic material such as rubber and having a substantially rectangular cross section.

The ECU 1 is accommodated into (containing portion 20b of) the inner box 20 of the first box unit 14 with the lid 17 detached from the container main body 16. Identified by 63a, 63b in FIG. 1 are connectors connected with connection portions 1b, 1c provided at the ECU 1. The grommet 55 to be arranged in the notches 33A, 33B is connected with wires 64A, 64B having the connectors 63a, 63b connected at their leading ends. The grommet 55 includes the large diameter portions 55a, 55b, a seal portion 55c to be inserted into the groove 57c of the outer sealing frame 57, and a seal portion 55d to be inserted into the groove 59c of the inner sealing frame 59. The grommet 55 is arranged at the conduit-shaped portion 34 after the large diameter portions 55a, 55b are accommodated in the grooves 34a, 34b, and the wires 64A, 64B are drawn out through the notches 33A, 33B.

The lid 17 is fitted to close the opening 13a in the upper surface of the container main body 16 after the ECU 1 is accommodated in the inner box 20 of the first box unit 14 and the wires 64A, 64B connected with the ECU 1 are drawn out through the notches 33A, 33B. At this time, the upper end of the outer box 21 of the first box unit 14 and the large diameter portion 55a of the grommet 55 are fitted into the groove 57a of the outer sealing frame 57, thereby coming into contact with the first packing member 58. Further, the upper end of the inner box 20 of the first box unit 14 and the large diameter portion 55b of the grommet 55 are fitted into the groove 59c of the outer sealing frame 59, thereby coming into contact with the second packing member 61. Thus, the interior of the container main body 16 is doubly sealed by the first and second packing members 58, 61, securely preventing the entrance of water moisture into the inside of the container main body 16 through a space between the lid 17 and the container main body 16.

As described above, the first heat removing space 32A is defined between the side walls 23a to 24b of the inner box 20 and the side walls 27a to 28b of the outer box 21. Further, the side walls 46a to 47b of the second box unit 15 are continuous with the bottom ends of the side walls 27a to 28b of the outer box 21 of the first box unit 14. The second heat removing space 32B is defined between the lower portions of the side walls 23a to 24b and the bottom wall 25 of the first box unit 14 and the side walls 46a to 47b and the bottom wall 48 of the second box unit 15. The first and second heat removing spaces 32A, 32B communicate with each other via the opening 30a. Thus, air in the first and second heat removing spaces 32A, 32B is discharged through the exhaust port portion 40 while air outside the vehicle is admitted into the first and second heat removing spaces 32A, 32B through the intake port portion 52 by the rotation of the fan 44 of the radiator while an engine 10 operates. Therefore, the surroundings of the inner box 20 in which the ECU 1 is contained are cooled by the circulation of air, thereby preventing the transmission of heat in the engine compartment 2b to the ECU 1.

The invention is not limited to the foregoing embodiment, and a variety of changes are possible. For example, although the projections 38, 45 provided at the bottom end of the first box unit 14 project while extending in contact with the inner surfaces of the side walls 46a, 46b of the second box unit 15, an upper end portion of the second box unit 15 may be so formed as to project while extending in contact with the lower end portions of the side walls 23a, 23b of the outer box 21 of the first box unit 14.

The first and/or second box unit 14, 15 may be formed or molded or made out of a thermoplast having a high thermal conductivity and/or out of a resin or thermoplast including or comprising particles having a high thermal conductivity such as metal, carbon particles and/or carbide particles. Furthermore the side walls 23a, 23b, 24a, 24b may be formed with projections or ribs to improve the heat exchange with the surrounding air, in particular with the air being flushed through or contained in the heat removing space 32A and/or 32B.

Next a further embodiment of the invention is described with reference to FIGS. 4 to 6, wherein same or identical elements are denoted with same or corresponding reference signs. An electronic control unit (ECU) 1 is contained in a container 12 as shown FIGS. 4 and 5, and is arranged in an engine compartment of an automotive vehicle 2 as shown in FIG. 6.

The ECU 1 is provided with a circuit board 70 inside a housing 1a e.g. of resin.

Figure 5:
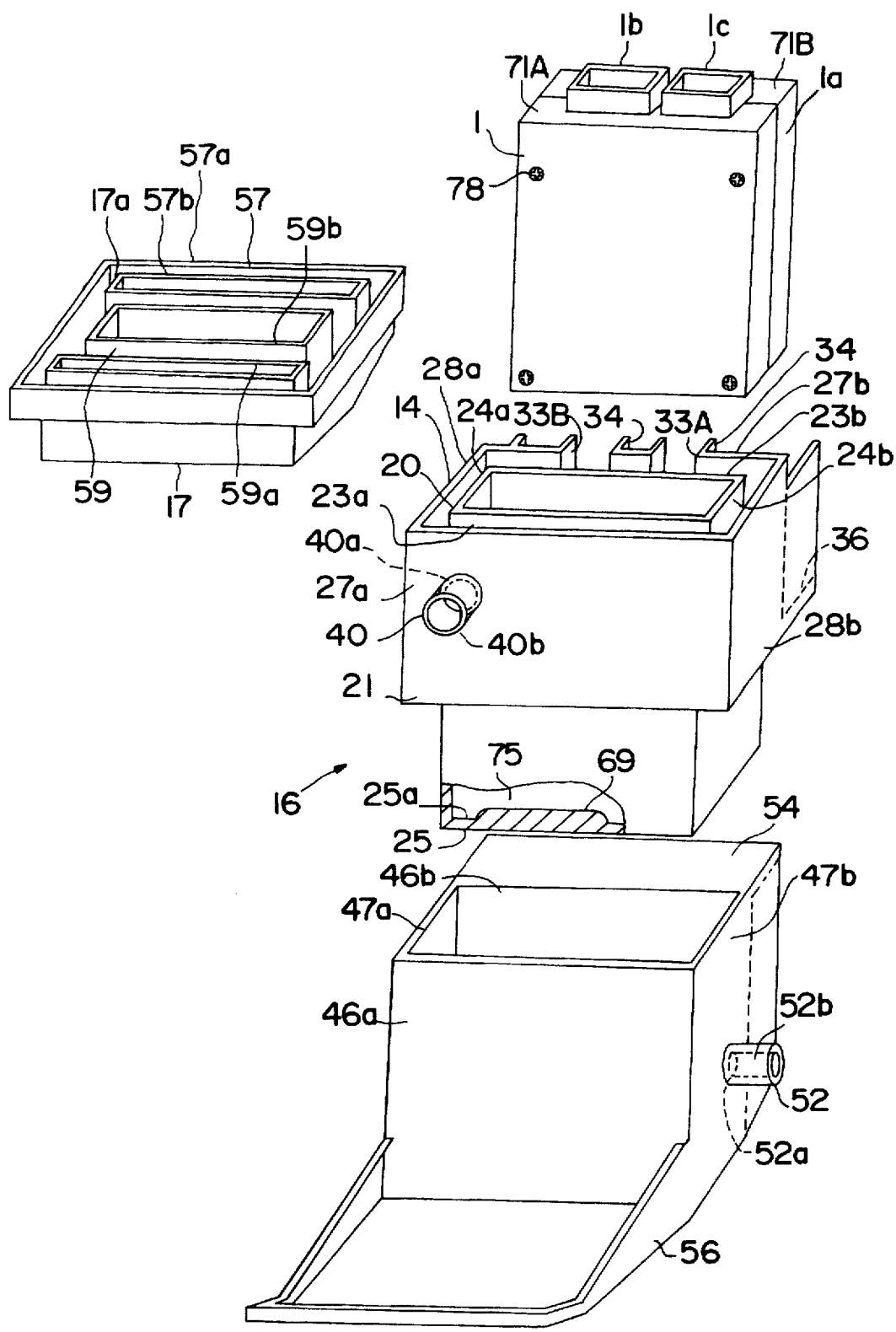
FIG. 5 is a schematic exploded perspective view partly in section of the container.

As shown in FIG. 5, the housing 1a is divided along a vertical plane into first and second half pieces 71A, 71B. The first and second half pieces 71A, 71B are integrally assembled into the housing 1a by screws 78. There is a very narrow clearance 76 between the first and second half pieces 71A, 71B.

The circuit board 70 is a printed circuit board e.g. of resin, and a specified circuitry is formed of a copper leaf on a wire arrangement surface 70a. A connector 72 for connecting wires 64A, 64B to be described later and other electronic devices 73 are mounted on the wire arrangement surface 70a. The circuit board 70 is mounted on one half piece 71A, and is arranged within the housing 1a such that the wire arrangement surface 70a extends preferably along the substantially vertical direction as shown in FIGS. 4 and 5.

Figure 6A:
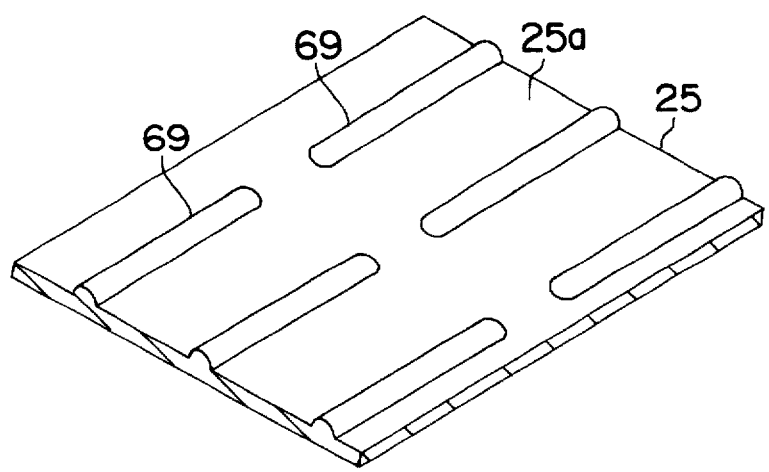
FIGS. 6(A) and 6(B) are enlarged perspective views of projections.

A plurality of projections 69 are formed on an inner surface 25a of the bottom wall 25 of the inner box 20 of the container 12. As shown in FIG. 6(A), the projections 69 are long or oblong projections each having a substantially semicircular cross section and are spaced apart in parallel by a specified distance.

Figure 4:
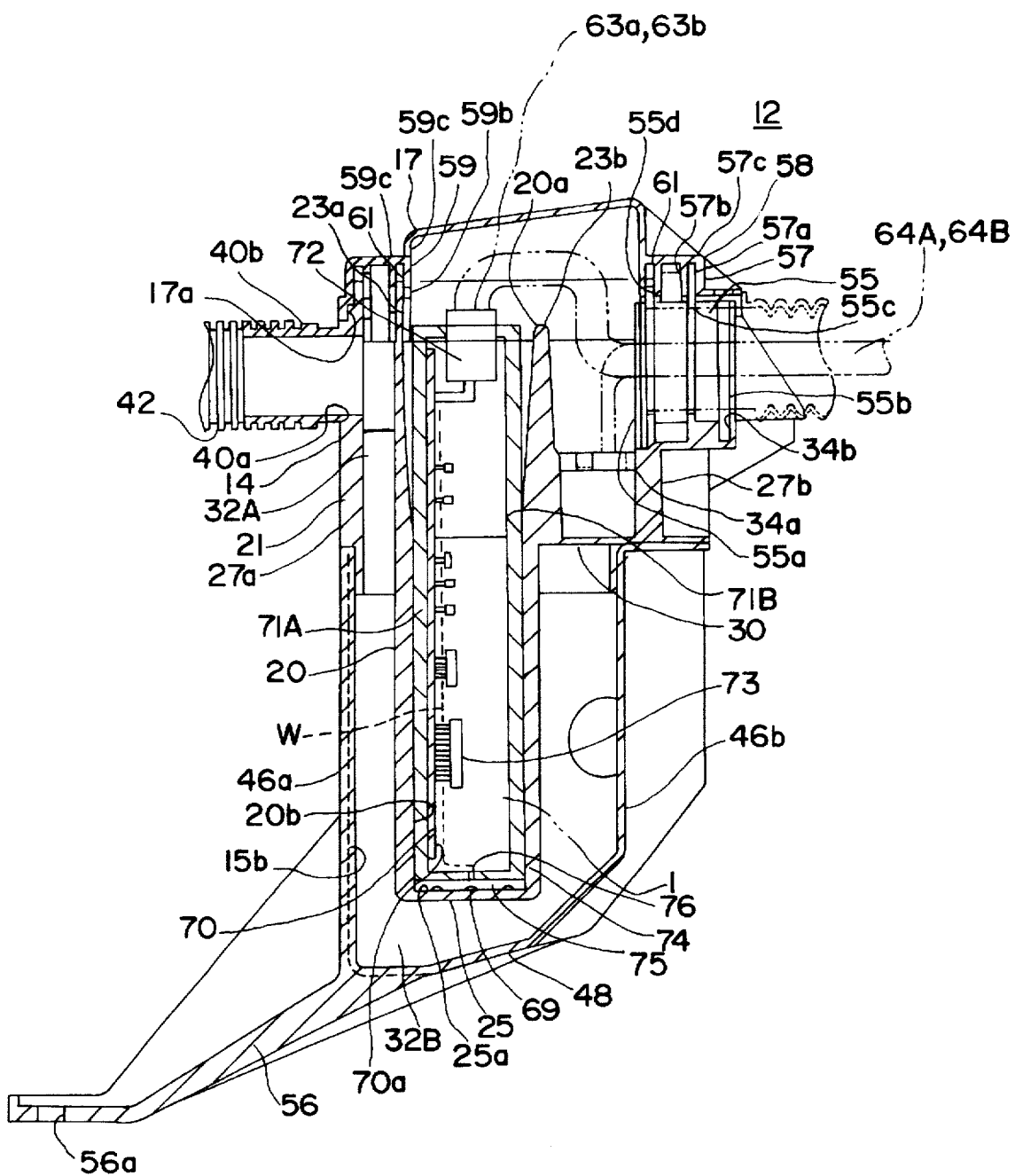
FIG. 4 is a longitudinal section of a container for an electronic control unit according to the invention.

The lid 17 has a thin rectangular parallelepipedic shape having an opening 17a in its lower part in FIG. 4, and is provided with an outer sealing frame 57 and an inner sealing frame 59 formed inwardly of the outer sealing frame 57. The outer sealing frame 57 includes a pair of opposite guide wall portions 57a, 57b. A first packing member 58 is inserted into a bottom portion of a groove 57c formed between the guide wall portions 57a, 57b. The inner sealing frame 59 includes a pair of opposite wall portions 59a, 59b. A second packing member 61 is inserted into a bottom portion of a groove 59c formed between the wall portions 59a and 59b.

The first box unit 14 and the second box unit 15 are secured by inserting and accommodating the lower portion of the inner box 20 into the interior 15b of the second box unit 15, by bringing the lower end surface of the first box unit 14 into contact with the upper end surface of the second box unit 15 and by e.g. applying ultrasonic welding to the periphery of a join portion. The first and second heat removing spaces 32A, 32B communicate with each other via the opening 30a.

The ECU 1 is accommodated into the inner box 20 of the first box unit 14 with the lid 17 detached from the container main body 16. The housing 1a of the ECU 1 is accommodated in the inner box 20 such that the wire arrangement surface 70a of the circuit board 70 extends substantially along the vertical direction. At this time, an outer surface 74a of a bottom wall 74 of the housing 1a comes into contact with one or more of the tips of the projections 69 formed on the inner surface 35a of the bottom wall 25 of the inner box 20. Thus, a space (water storing portion 75) is formed between the bottom wall 74 of the housing 1a and the bottom wall 25 of the inner box 20.

In the case that water moisture enters the housing 1a of the ECU 1 via the wires 64A, 64B or forms dewdrops in the housing 1a, it runs down along the wire arrangement surface 70a to be discharged from the housing 1a through the clearance 76 at the bottom wall 74 by action of gravity as indicated by dotted line W in FIG. 4. Consequently, the water moisture is stored in the water storing portion 75 formed between the bottom wall 74 of the housing 1a and the bottom wall 25 of the inner box 20. Since the inside of the container 12 is sealed by the lid 17 as described above and only a minor amount of water moisture is produced in the housing 1a of the ECU 1, the water moisture stored in the water storing portion 75 rapidly evaporates. Thus, in this embodiment, the water moisture having entered via the wires 64A, 64B or dewdrops formed therefrom can be securely discharged from the housing 1a of the ECU 1.

Further, since the first and second heat removing spaces 32A, 32B communicate with each other via the opening 30a as described above, air in the first and second heat removing spaces 32A, 32B is discharged through the discharge port portion 40 by the rotation of the fan 44 of the radiator while air outside the vehicle is admitted to the first and second heat removing spaces 32A, 32B by the rotation of the fan 44 of the radiator while an engine 10 operates. Therefore, the surroundings of the inner box 20 in which the ECU 1 is contained are cooled by the circulation of air, thereby preventing the transmission of heat in the engine compartment 2b to the ECU 1.

Figure 6B:
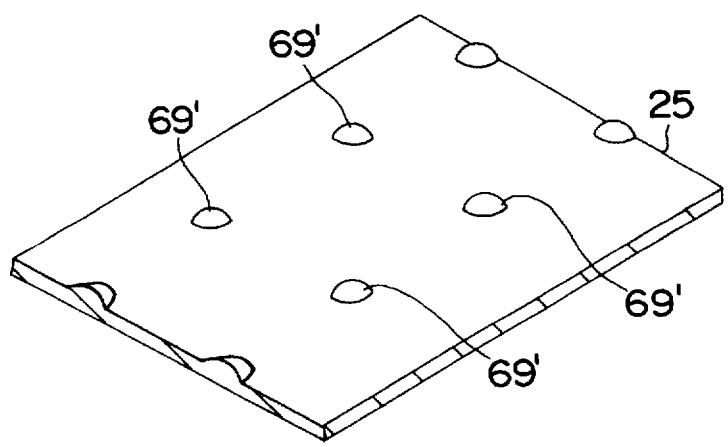
Figure 7:
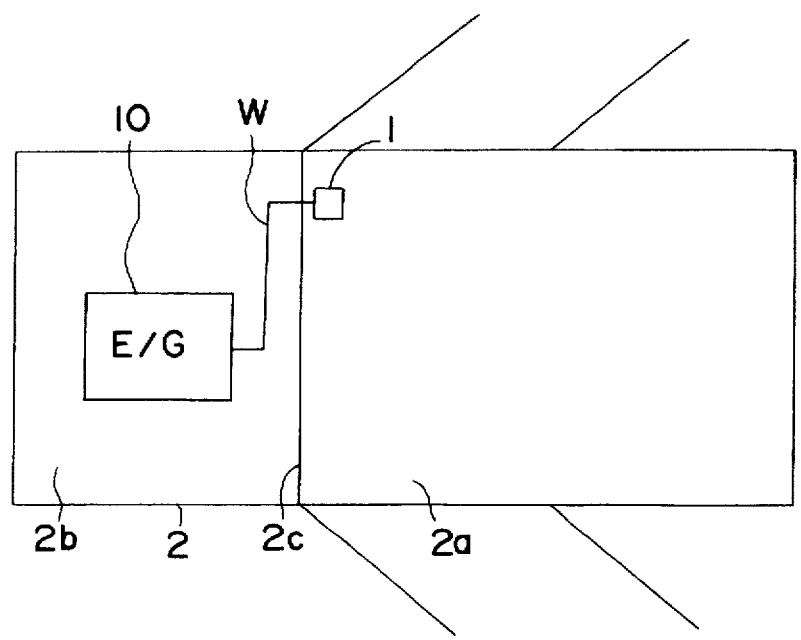
FIG. 7 is a diagram showing a mount position of a prior art ECU.
Figure 8:
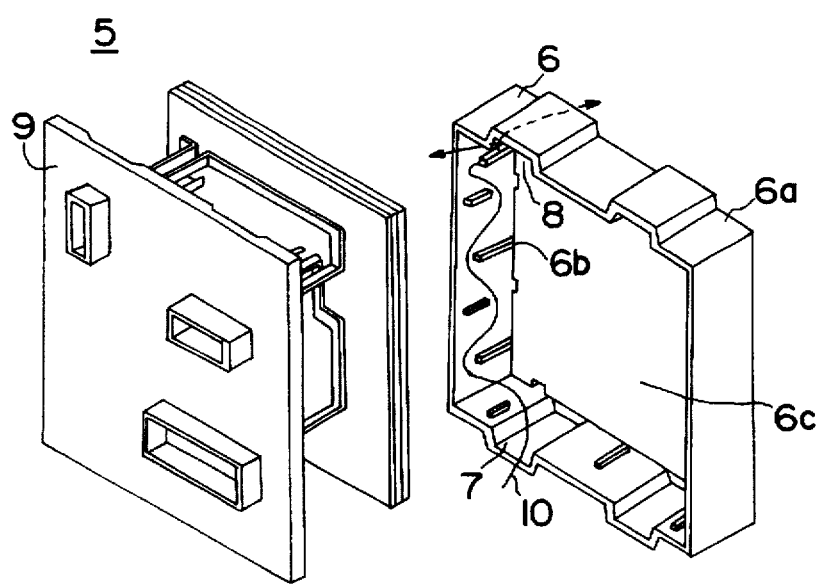
FIG. 8 is an exploded perspective view of an exemplary prior art electronic control unit.
Figure 9:
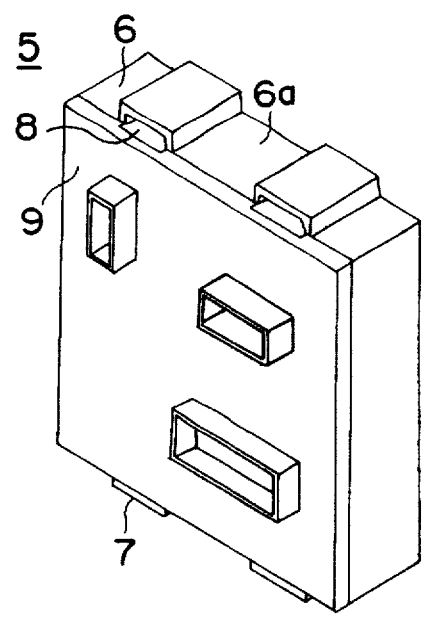
FIG. 9 is a perspective view of another exemplary prior art electronic control unit.
Figure 10:
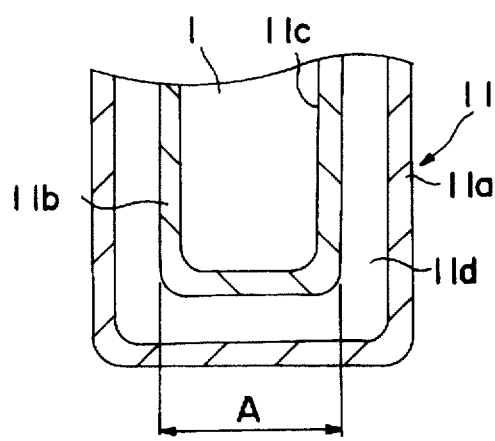
FIG. 10 is a partial section showing a problem residing in still another prior art electronic control unit.

The invention is not limited to the foregoing embodiment, and a variety of changes are possible. For example, although the water storing portion is formed by providing the projections on the inner surface of the bottom wall of the container in this embodiment, it may be formed by providing projections on the outer surface of the bottom wall of the electronic control unit. Further, the shape of the projections is not limited to the one shown in FIG. 6(A). For example, a multitude of substantially semispherical projections 69' may be arranged at specified intervals along lateral and longitudinal directions as shown in FIG. 6(B).

What is claimed is:

1. A container (12) for containing an electronic control unit (1) in an engine compartment (2b), comprising:

a first box unit (14) comprising an inner box (20) for containing the electronic control unit (1) and an outer box (21), a second box unit (15) substantially sealed in telescoped engagement with said outer box (21), said first and second box units (14, 15) being dimensioned and configured to define at least one heat removing space (32A; 32B) at least partly surrounding the inner box (20), an intake port (52) and an exhaust port (42) for permitting air flow through the heat removing space (32A, 32B).

2. A container according to claim 1, wherein a lower end (30; 36; 38; 45) of the outer box (21) of the first box unit (14) and an upper end (46a; 46b; 54) of the second box unit (15) are secured to each other.

3. A container according to claim 1, wherein, a lower end (30; 36; 38; 45) of the first box unit (14) is welded in said telescoped engagement in an upper end (46a; 46b; 54) of the second box unit (15).

4. A container according to claim 2, further comprising a lid (17) substantially closing an open top (13a) of the inner box (20) and the outer box (21) of the first box unit.

5. A container according to claim 4, wherein the lid (17) has a sealing construction comprising:

an outer sealing frame (57), provided substantially along a periphery of the lid (17), into which an upper end of the outer box (21) of the first box unit (14), is insertable, and an inner sealing frame (59) provided inwardly of and at a specified distance from the outer sealing frame (57), and into which an upper end of the inner box (20) of the first box unit (14), is insertable, and packing members (58; 61) arranged in bottom portions of the outer (57) and/or inner (59) sealing frames.

6. A container according to claim 1, wherein said inner box (20) and said outer box (21) are integrally formed as said first box unit (14).

7. A container according to claim 1, further comprising a fan (44) in communication with the exhaust port (42).

8. A container (12) for containing an electronic control unit (1) in an engine compartment (2b), comprising:

a housing (1a), in which a circuit board (70) of the electronic control unit (1) is arranged, an outlet (76) formed in a bottom wall (74) of the housing (1a) for accommodating water moisture flow, an inner box (20) substantially enclosing the housing (1a), a water storing portion (75) for storing water moisture which exits the housing (1a) through the outlet (76), an outer box (21) substantially enclosing said inner box (20), said inner and outer boxes (20, 21) being dimensioned to define a heat removing space (32A, 32B) therebetween, and an intake port (52) and an exhaust port (40) in communication with said heat removing space (32A; 32B) for permitting air flow.

9. A container according to claim 8, wherein the water storing portion (75) is formed between the bottom wall (74) of the housing (1a) and a bottom wall (25) of the inner box (20) by forming a projected portion (69; 69') between the inner surface (25a) of the bottom wall (25) of the inner box (20) and the outer surface of the bottom wall (74) of the housing (1a), so that water said moisture which enters the housing (1a) of the electronic control unit (1) flows to be discharged to the water storing portion (75) through the outlet (76) formed at the bottom wall (74) of the housing (1a).

10. A container according to claim 9, wherein the housing (1a) is formed by joining a plurality of pieces (71A; 71B), and wherein the outlet (76) is formed in a join portion or portions of the pieces (71A; 71B).

11. A container according to claim 10, wherein the projected portion (69; 69') comprises a plurality of projections (69') arranged at specified intervals.

12. A container according to claim 8, wherein said inner box (20) is integrally formed with a portion of said outer box (21).

13. A container according to claim 8, further comprising a fan (44) communicating with the exhaust port (42).

14. A container (12) for containing an electronic control unit (1) in an engine compartment (2b), said container (12) comprising:

a first box unit (14) unitarily formed from a resin material and having an inner box (20) with a closed bottom and an open top and an outer box (21) having a plurality of side walls disposed in spaced relationship to said inner box and having an open bottom, at least one wall (30) extending between the inner box (20) and the outer box (21) for supporting the respective inner and outer boxes (20, 21) in spaced relationship, a unitarily formed second box unit (15) having a closed bottom and an open top, said open top of said second box unit (15) being securely sealed to said open bottom of said outer box (21) of said first box unit (14), said second box unit (15) being dimensioned to lie in spaced relationship to said inner box (20) of said first box unit (14) such that said second box unit (15) and said outer box (21) of said first box unit (14) define a heat removing space (32A; 32B) substantially surrounding at least portions of said inner box (20), a lid (17) substantially closing at least said open top of said inner box (20); selected portions of at least one of said first box unit (14), said second box unit (15) and said lid (17) being formed to define a sealable conduit portion (34) in communication with said inner box (20), an intake port (52) communicating with said heat removing space (32A; 32B) and an exhaust port (42) communicating with said heat removing space (32A; 32B), said intake port (52) and said exhaust port (42) enabling heat removing air flow through said heat removing space (32A; 32B).

\* \* \* \* \*